(12) United States Patent
Winter, Jr.

(10) Patent No.: US 6,494,664 B1
(45) Date of Patent: Dec. 17, 2002

(54) VEHICLE CARGO LOADING AND UNLOADING SYSTEM

(76) Inventor: George A. Winter, Jr., 1610 North Banyan Dr., Venice, FL (US) 34293

( * ) Notice: Subject to any disclaimer, the term of this patent is extended or adjusted under 35 U.S.C. 154(b) by 0 days.

(21) Appl. No.: 09/775,444

(22) Filed: Feb. 2, 2001

(51) Int. Cl.$^7$ ................................................. B60S 13/02
(52) U.S. Cl. .......................... 414/401; 104/38; 104/44
(58) Field of Search ................................. 414/263, 401, 414/584; 104/35, 36, 38, 44, 46; 404/10; 52/173.2

(56) References Cited

U.S. PATENT DOCUMENTS

| | | | |
|---|---|---|---|
| 922,643 A | * | 5/1909 | Verplanck |
| 1,379,239 A | * | 5/1921 | Barwicki |
| 1,620,273 A | * | 3/1927 | Mayer |
| 1,661,123 A | * | 2/1928 | Kocsis |
| 1,881,033 A | | 10/1932 | Smith |
| 3,566,798 A | | 3/1971 | Peitzman |
| 4,016,990 A | | 4/1977 | Hodkin et al. |
| 4,166,546 A | * | 9/1979 | English ..................... 414/263 |
| 4,172,422 A | * | 10/1979 | McBride ..................... 104/44 |
| 4,594,044 A | * | 6/1986 | Soot ........................... 414/263 |
| 4,716,837 A | | 1/1988 | Valencia |
| D313,324 S | | 1/1991 | James |
| 5,086,704 A | | 2/1992 | Mueller |
| 5,755,160 A | * | 5/1998 | Blufordcraving ............ 104/36 |

FOREIGN PATENT DOCUMENTS

GB          2235426        * 3/1991

* cited by examiner

*Primary Examiner*—James W. Keenan

(57) ABSTRACT

A vehicle cargo loading and unloading system for rotating a vehicle in an area where there is a limited amount of space in which to maneuver. The vehicle cargo loading and unloading system includes a vehicle support platform for supporting the vehicle to be turned. The vehicle support platform includes an upper surface, a lower surface and a peripheral edge extending between the upper and lower surfaces. A plurality of rolling assemblies is provided for rotatably turning the vehicle supporting platform. Each of the rolling assemblies is movably mounted to the lower surface of the vehicle supporting platform. A supporting shaft is provided for supporting the vehicle supporting platform. The supporting shaft includes a first end and a second end, wherein the first end is mounted to a central point of the vehicle supporting platform. A gear is mounted to a portion of the supporting shaft and is operationally coupled to a motor used for turning the shaft.

3 Claims, 2 Drawing Sheets

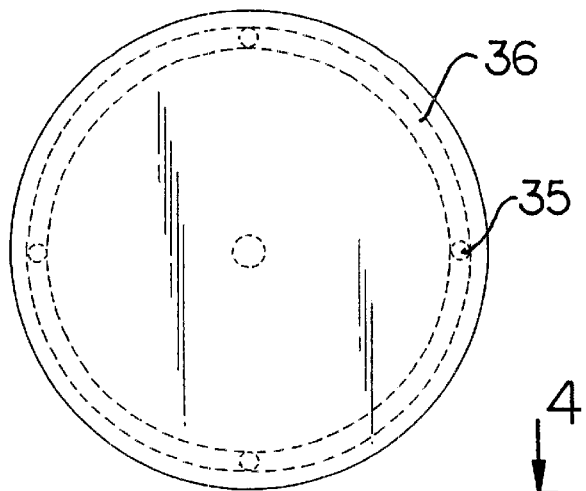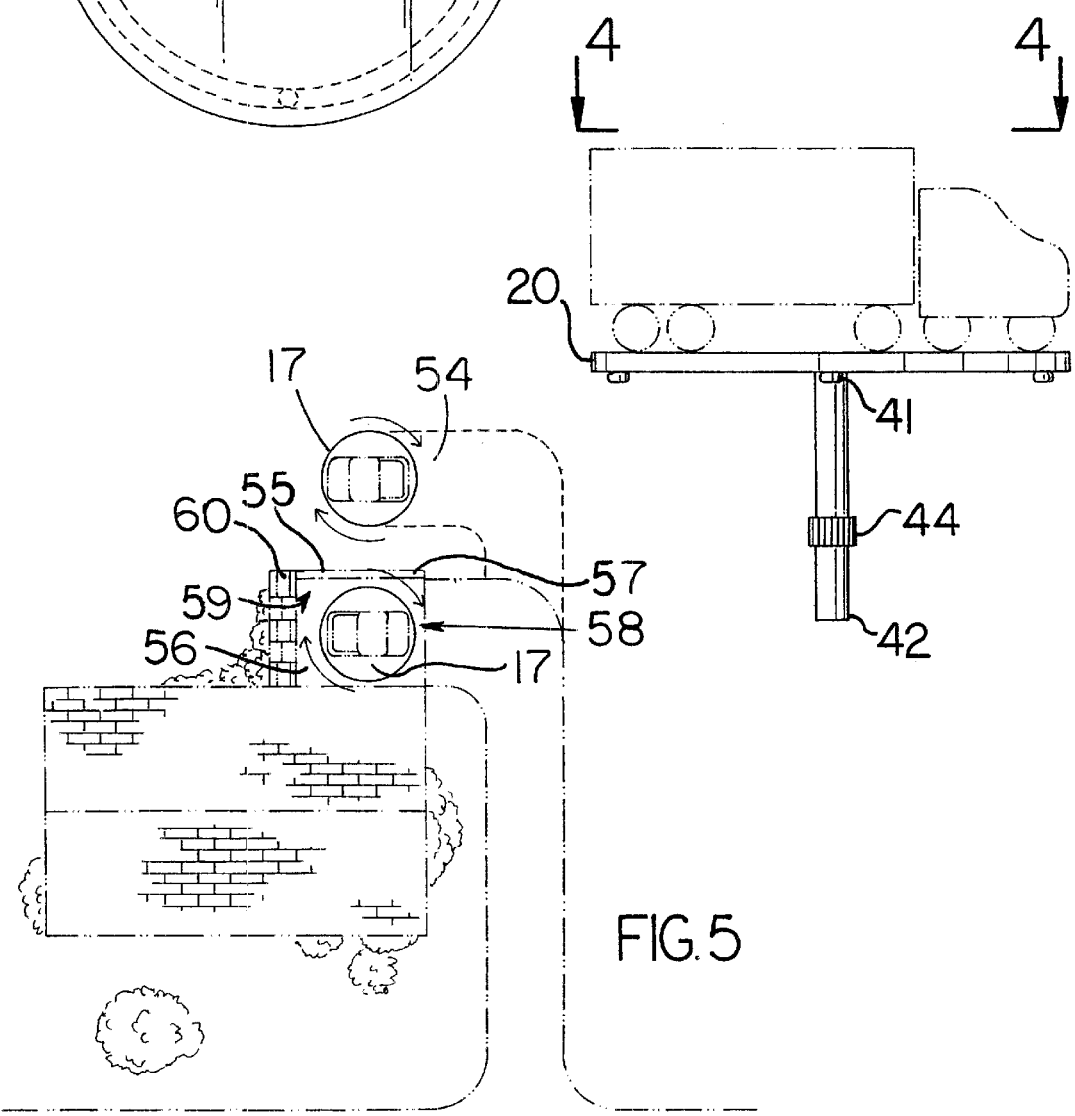

VEHICLE CARGO LOADING AND UNLOADING SYSTEM

BACKGROUND OF THE INVENTION

1. Field of the Invention

The present invention relates to cargo loading and unloading systems and more particularly pertains to a new vehicle cargo loading and unloading system for rotating a vehicle in an area where there is a limited amount of space in which to maneuver.

2. Description of the Prior Art

The use of cargo loading and unloading systems is known in the prior art. More specifically, cargo loading and unloading systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,086,704; U.S. Pat. No. 3,566,798; U.S. Pat. No. 1,881,033; U.S. Pat. No. 4,016,990; U.S. Pat. No. 4,716,837; and U.S. Pat. No. Des. 313,324.

While these devices fulfill their respective, particular objectives and requirements, the aforementioned patents do not disclose a new vehicle cargo loading and unloading system. The inventive device includes a vehicle support platform for supporting the vehicle to be turned. The vehicle support platform includes an upper surface, a lower surface and a peripheral edge extending between the upper and lower surfaces. A plurality of rolling assemblies is provided for rotatably turning the vehicle supporting platform. Each of the rolling assemblies is movably mounted to the lower surface of the vehicle supporting platform. A supporting shaft is provided for supporting the vehicle supporting platform. The supporting shaft includes a first end and a second end, wherein the first end is mounted to a central point of the vehicle supporting platform. A gear is mounted to a portion of the supporting shaft and is operationally coupled to a motor used for turning the shaft.

In these respects, the vehicle cargo loading and unloading system according to the present invention substantially departs from the conventional concepts and designs of the prior art, and in so doing provides an apparatus primarily developed for the purpose of rotating a vehicle in an area where there is a limited amount of space in which to maneuver.

SUMMARY OF THE INVENTION

In view of the foregoing disadvantages inherent in the known types of cargo loading and unloading systems now present in the prior art, the present invention provides a new vehicle cargo loading and unloading system construction wherein the same can be utilized for rotating a vehicle in an area where there is a limited amount of space in which to maneuver.

The general purpose of the present invention, which will be described subsequently in greater detail, is to provide a new vehicle cargo loading and unloading system apparatus and method which has many of the advantages of the cargo loading and unloading systems mentioned heretofore and many novel features that result in a new vehicle cargo loading and unloading system which is not anticipated, rendered obvious, suggested, or even implied by any of the prior art cargo loading and unloading systems, either alone or in any combination thereof.

To attain this, the present invention generally comprises a vehicle support platform for supporting the vehicle to be turned. The vehicle support platform includes an upper surface, a lower surface and a peripheral edge extending between the upper and lower surfaces. A plurality of rolling assemblies is provided for rotatably turning the vehicle supporting platform. Each of the rolling assemblies is movably mounted to the lower surface of the vehicle supporting platform. A supporting shaft is provided for supporting the vehicle supporting platform. The supporting shaft includes a first end and a second end, wherein the first end is mounted to a central point of the vehicle supporting platform. A gear is mounted to a portion of the supporting shaft and is operationally coupled to a motor used for turning the shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least One embodiment of the invention in detail it is to be understood that the invention is not limited in its application to the details of construction and to the arrangements of the arrangement of the components set forth in the following description or illustrated in the drawings The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart form the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is measured by the claims, nor is it intended to be limiting as to the scope of the invention in any way.

It is therefore an object of the present invention to provide a new vehicle cargo loading and unloading system apparatus and method which has many of the advantages of the cargo loading and unloading systems mentioned heretofore and many novel features that result in a new vehicle cargo loading and unloading system which is not anticipated, rendered obvious, suggested, or even implied by any of the prior art cargo loading and unloading systems, either alone or in any combination thereof.

It is another object of the present invention to provide a new vehicle cargo loading and unloading system which may be easily and efficiently manufactured and marketed.

It is a further object of the present invention to provide a new vehicle cargo loading and unloading system which is of a durable and reliable construction.

An even further object of the present invention is to provide a new vehicle cargo loading and unloading system which is susceptible of a low cost of manufacture with regard to both materials and labor, and which accordingly is then susceptible of low prices of sale to the consuming public, thereby making such vehicle cargo loading and unloading system economically available to the buying public.

Still yet another object of the present invention is to provide a new vehicle cargo loading and unloading system which provides in the apparatuses and methods of the prior art some of the advantages thereof, while simultaneously overcoming some of the disadvantages normally associated therewith.

Still another object of the present invention is to provide a new vehicle cargo loading and unloading system for rotating a vehicle in an area where there is a limited amount of space in which to maneuver.

Yet another object of the present invention is to provide a new vehicle cargo loading and unloading system which includes a vehicle support platform for supporting the vehicle to be turned. The vehicle support platform includes an upper surface, a lower surface and a peripheral edge extending between the upper and lower surfaces. A plurality of rolling assemblies is provided for rotatably turning the vehicle supporting platform. Each of the rolling assemblies is movably mounted to the lower surface of the vehicle supporting platform. A supporting shaft is provided for supporting the vehicle supporting platform. The supporting shaft includes a first end and a second end, wherein the first end is mounted to a central point of the vehicle supporting platform. A gear is mounted to a portion of the supporting shaft and is operationally coupled to a motor used for turning the shaft.

Still yet another object of the present invention is to provide a new vehicle cargo loading and unloading system that reduces the amount of time wasted in maneuvering a vehicle such as a semi-truck to align the rear of the truck with a loading dock door. The present invention allows semi-trucks, to pull into a loading dock head first and then rotate the truck aligning the rear of the truck with the loading dock door.

Even still another object of the present invention is to provide a new vehicle cargo loading and unloading system that provides homeowners with a means of turning their vehicle around in their driveway or in their garage. The present invention also reduces the potential for a vehicle accident resulting from backing a vehicle into a roadway. The present invention allows homeowners to turn their vehicles around in order to enter the roadway head-on.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of the present invention showing a gear mounted to a portion of the support member.

FIG. 4 is a schematic top view of the present invention showing a plurality of rolling assemblies positioned between a pair of rail members.

FIG. 5 is a schematic top view of the present invention in a residential driveway and in an interior space of a garage.

DESCRIPTION OF THE PREFERRED EMBODIMENT

Figure 1:
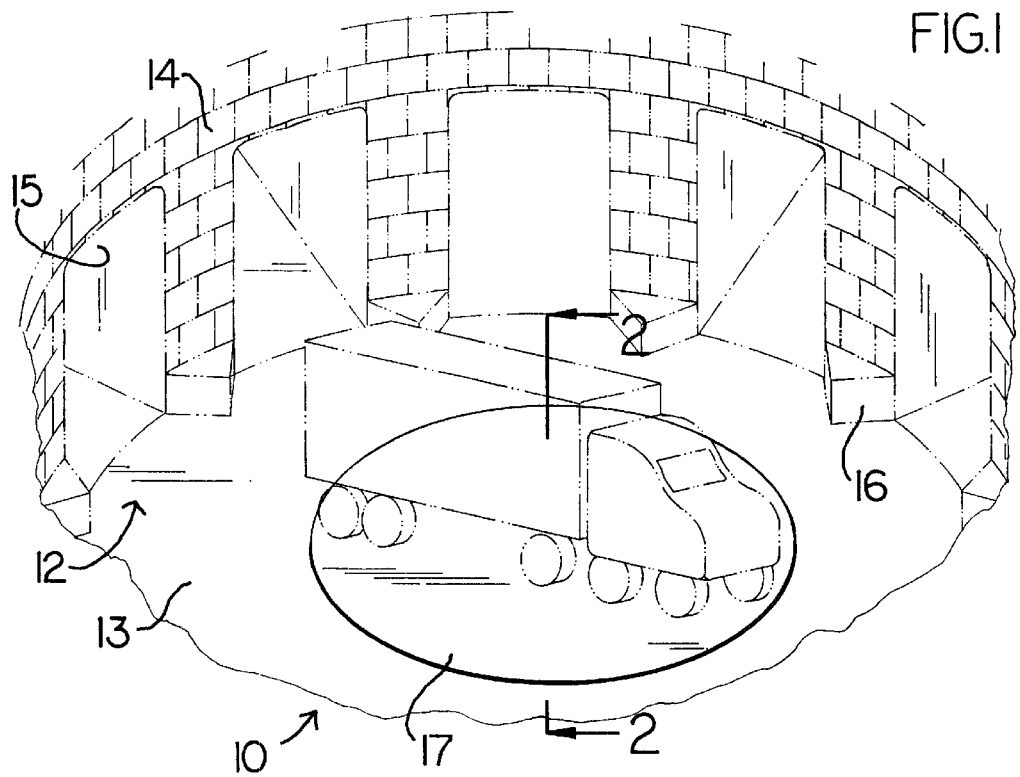
FIG. 1 is a schematic perspective view of a new vehicle cargo loading and unloading system according to the present invention showing the present invention being used at a warehousing.

With reference now to the drawings, and in particular to FIGS. 1 through 5 thereof, a new vehicle cargo loading and unloading system embodying the principles and concepts of the present invention and generally designated by the reference numeral 10 will be described.

As best illustrated in FIGS. 1 through 5, the vehicle cargo loading and unloading system 10 provides the rotation of vehicles in areas having a limited amount of space such as, for example, a small drive way or a docking bay, or within a structure such as, for example, a residential or commercial garage, a warehouse, or a factory. The vehicle cargo loading and unloading system 10 generally comprises a loading dock assembly 12 for loading and unloading the vehicles. The loading dock assembly 12 preferably comprises a stationary floor section 13 made of a substantially rigid material that is able to support a weight of the vehicles. A wall 14 is mounted on the stationary floor section that includes a plurality of openings 15 extending therein. The wall 14 preferably has a generally arcuate shape. Each of the openings 15 extending into the wall preferably comprises a cargo bay.

A plurality of cushion members 16 is provided for cushioning a rear of a vehicle backing up to one of the openings 15 of the wall 14 to loading or unloading cargo. Each of the cushion members 16 is mountable to an outer surface of the wall 14. Each of the cushion members is preferably positioned generally below and adjacent to one of the openings 15 such that each of the openings 15 includes a pair of the cushion members 15.

A vehicle support platform 17 is provided for supporting the vehicle to be turned around a central point. The vehicle support platform 17 includes an upper surface 18, a lower surface 19 and a peripheral edge 20 extending between the upper 18 and lower 19 surfaces. The vehicle support platform 17 preferably has a generally circular shape. The vehicle support platform 17 may comprise a substantially rigid material such as, for example, a metal material.

Figure 2:
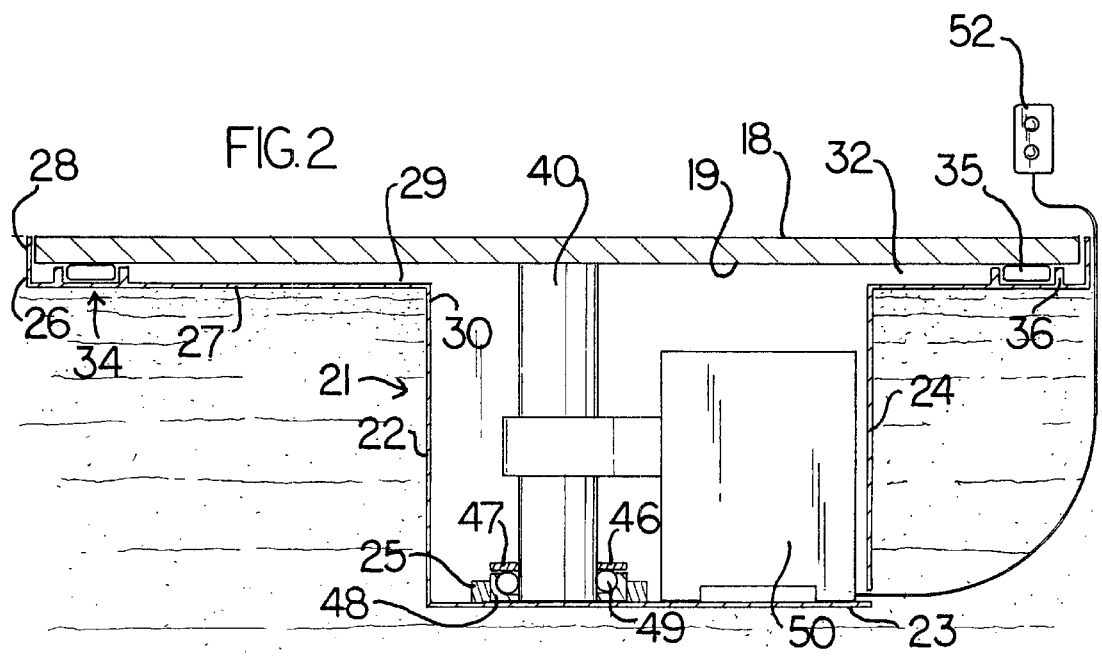
FIG. 2 is a schematic cross-section view of the present invention taken along line 2—2 of FIG. 1, showing a vehicle support platform and a support member being rotatably mounted in a pit assembly.

As illustrated in FIG. 2, a pit assembly 21 may be provided for receiving the vehicle support platform 16. The pit assembly 21 may comprise a lower portion 22 that includes a bottom wall 23 and a peripheral wall 24 extending upwardly away from the bottom wall 23. An annular member 25 may extend upwardly away from the bottom wall 23. The annular member 25 is preferably positioned generally an equal distance between the peripheral wall 24 such that the annular member 25 is positioned in the center of the lower portion 22. Each of the walls 23 and 24 may comprise a substantially rigid material such as, for example, a metal or a mortar or concrete material.

An upper portion 26 of the pit assembly 21 includes a lower wall 27 and a perimeter wall 28 extending upwardly away from the lower wall 27. The perimeter wall 28 preferably has a generally circular shape equal to the circular shape of the vehicle support platform 16. An inner edge 29 of the lower wall 27 is coupled to an upper edge 30 of the peripheral wall 24 of the lower portion 22. The vehicle supporting platform 16 is rotatably positioned in a cavity 32 extending into the upper portion 26.

A plurality of rolling assemblies 34 is provided for rotatably turning the vehicle supporting platform 17 in the cavity 32 of the upper portion 26. Each of the rolling assemblies 34 is movably mounted to the lower surface 16 of the vehicle supporting platform 17. Each of the rolling assemblies 34 is positioned generally adjacent to the peripheral edge 19 of the vehicle supporting platform 17. Each of the rolling assemblies 34 preferably comprises a roller 35 having a plurality of bearings rotatably mounted therein.

As illustrated in FIGS. 2 and 4, a pair of annular rails 36 may be provided for selectively receiving each of the rolling assemblies 34. Each of the annular rails 36 extends upwardly away from the lower wall 27 of the upper portion 26. Each of the annular rails 36 is preferably positioned generally next to each other wherein each of the rolling assemblies 34 rolls in a track defined by a distance extending between each of the annular rails 36.

As illustrated in FIGS. 2 and 3, a supporting shaft 40 is provided for supporting the vehicle supporting platform 17. The supporting shaft 40 includes a first end 41 and a second end 42. The first end 41 of the shaft 40 is mounted to a central point of the vehicle supporting platform 17. The second end 42 of the shaft 40 extends downwardly toward the bottom wall 23 of the lower portion 22. The supporting shaft 40 may comprise a substantially rigid material such as, for example, a steel or a iron material.

A gear 44 is mounted to a portion of the supporting shaft 40 and is positioned generally an equal distance between the vehicle supporting platform 17 and the bottom wall 23 of the lower portion 22. The gear 44 extends around a circumference of the supporting shaft 40.

A bearing member 46 may be provided for rotatably mounting the second end 42 of the supporting shaft 40 to the bottom wall 23 of the lower portion 22. The bearing member 46 is movably mounted in the annular member 25. The bearing 46 may include an upper disk 47, a lower disk 48 and a plurality of balls 49 for rotatably moving the upper disk in relation to the lower disk 48. Each of the balls 49 is movably positioned between the upper disk and the lower disk 48. The second end 42 of the shaft 40 is rotatably mounted to an upper surface of the upper disk. The bearing member 46 may comprise a bearing that is capable of supporting part of the weight of the supporting shaft 40, the vehicle support platform 12 and the vehicle being turned on the vehicle support platform 12. The bearing member 46 may comprise a bearing such as, for example, a thrust roller bearing.

A motor 50 is provided for turning the supporting shaft 40. The motor 50 is operationally coupled to the gear 44 that rotates the vehicle support platform 17. The motor 50 may be positioned generally between the supporting shaft 40 and the peripheral wall 24 of the lower portion 22.

As illustrated in FIG. 2, a switch 52 may be provided for selectively providing power to the motor 50 and turning the motor 50 ON and OFF. The switch 52 is electrically connected to the motor 50.

In use, the motor 50 turns a vehicle on the vehicle support platform 12 in a 360 degree radius enabling cargo to be loaded and unloaded from the vehicle in an area having a limited amount of space in which to maneuver the vehicle.

In another embodiment, as illustrated in FIG. 5, the vehicle support platform 17 may be used in combination with a garage assembly. The garage assembly preferably includes a driveway section 54. The vehicle support platform 17 may be movably mounted in the driveway section 54 for turning a vehicle parked in the driveway section 54.

The garage assembly may also include a garage 55 that has a floor 56 and a peripheral wall 57 extending upwardly away from the floor 56. The peripheral wall 57 of the garage 55 preferably has an opening 58 extending into a cavity 59 of the garage 55 A cover 60 may be provided for covering the cavity 59 of the garage 55. The cover 60 is coupled to an upper edge of the peripheral wall 57 of the garage 55. The vehicle support platform 17 may be movably mounted in the floor 56 of the garage assembly for rotatably turning a vehicle parked in the garage 55.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle cargo loading and unloading system for more easily maneuvering vehicles needing to have cargo loaded or unloaded, said system comprising:

a loading dock assembly for loading and unloading the vehicles, said loading dock assembly comprising:
a stationary floor section;
a wall being mounted on said stationary floor section, said wall having a plurality of openings extending therein, said wall having a generally arcuate shape;

said loading dock assembly including a plurality of cushion members for cushioning a rear of a vehicle backing up to one of said openings of said wall, each of said cushion members being mountable to an outer surface of said wall, each of said cushion members being positioned between adjacent said openings such that each of said openings includes a pair of said cushion members;

a vehicle support platform for supporting the vehicles, said vehicle support platform being rotatably mountable in said stationary floor section such that each of said openings face a central portion of said vehicle support platform, said vehicle support platform having an upper surface, a lower surface and a peripheral edge extending between said upper and lower surfaces;

a plurality of rolling assemblies for rotatably turning said vehicle support platform, each of said rolling assemblies being movably mounted to said lower surface of said vehicle support platform;

a supporting shaft for supporting said vehicle support platform, said supporting shaft having a first end and a econd end, said first end of said supporting shaft being mounted to a central point of said vehicle supporting platform;

a gear being mounted to a portion of said supporting shaft; and a motor for turning said shaft, said motor being operationally coupled to said gear;

wherein each of said cushion members has a substantially triangular shape such that each of said cushion members protects a wall section located between said adjacent openings while maximizing an area of said stationary floor of said loading dock assembly.

2. A vehicle cargo loading and unloading system for more easily maneuvering vehicles needing to have cargo loaded or unloaded, said system comprising:

a loading dock assembly for loading and unloading the vehicles, said loading dock assembly comprising:
  a stationary floor section;
  a wall being mounted on said stationary floor section, said wall having a plurality of openings extending therein, said wall having a generally arcuate shape;
  said loading dock assembly including a plurality of cushion members for cushioning a rear of a vehicle backing up to one of said openings of said wall, each of said cushion members being mountable to an outer surface of said wall, each of said cushion members being positioned between adjacent said openings such that each of said openings includes a pair of said cushion members;
  a vehicle support platform for supporting the vehicles, said vehicle support platform being rotatably mountable in said stationary floor section such that each of said openings face a central portion of said vehicle support platform, said vehicle support platform having an upper surface, a lower surface and a peripheral edge extending between said upper and lower surfaces;
  a plurality of rolling assemblies for rotatably turning said vehicle support platform, each of said rolling assemblies being movably mounted to said lower surface of said vehicle support platform;
  a supporting shaft for supporting said vehicle support platform, said supporting shaft having a first end and a second end, said first end of said supporting shaft being mounted to a central point of said vehicle supporting platform;
  a gear being mounted to a portion of said supporting shaft; and
  a motor for turning said shaft, said motor being operationally coupled to said gear;
  wherein each of said cushion members has a substantially triangular shape and an arcuate outer side which generally conforms to said arcuate shape of said wall of said loading dock such that each of said cushion members protects a wall section located between said adjacent openings while maximizing an area of said stationary floor of said loading dock assembly.

3. A vehicle cargo loading and unloading system for more easily maneuvering a vehicle needing to have cargo loaded or unloaded, said system comprising:

a loading dock assembly for loading and unloading the vehicles, said loading dock assembly comprising:
  a stationary floor section;
  a wall being mounted on said stationary floor section, said wall having a plurality of openings extending therein, said wall having a generally arcuate shape, each of said openings extending into said wall comprising a cargo bay;
  a plurality of cushion members for cushioning a rear of a vehicle backing up to one of said openings of said wall, each of said cushion members being mountable to an outer surface of said wall, each of said cushion members being positioned generally below and adjacent to one of said openings such that each of said openings includes a pair of said cushion members;
  a vehicle support platform for supporting the vehicle to be turned around, said vehicle support platform having an upper surface, a lower surface and a peripheral edge extending between said upper and lower surfaces, said vehicle support platform having a generally circular shape, said vehicle support platform being rotatably mountable in a portion of said stationary floor for aligning each of said openings of said wall each with a central portion of said vehicle support platform, wherein each of said openings being alignable with a loading opening of a vehicle being parked on said vehicle support platform, said vehicle support platform comprising a substantially rigid material;
  a pit assembly for receiving said vehicle support platform, said pit assembly comprising:
    a lower portion having a bottom wall and a peripheral wall extending upwardly away from said bottom wall, an annular member extending upwardly away from said bottom wall, said annular member being positioned generally an equal distance between said peripheral wall, said peripheral wall having a generally circular shape, each of said walls comprising a substantially rigid material;
    an upper portion having a lower wall and a perimeter wall extending upwardly away from said lower wall, said perimeter wall having a generally circular shape, an inner edge of said lower wall being coupled to an upper edge of said peripheral wall of said lower portion, said vehicle supporting platform being rotatably positioned in a cavity extending into said upper portion;
  a plurality of rolling assemblies for rotatably turning said vehicle supporting platform in said cavity of said upper portion, each of said rolling assemblies being movably mounted to said lower surface of said vehicle supporting platform, each of said rolling assemblies being positioned generally adjacent to said peripheral edge of said vehicle supporting platform, each of said rolling assemblies comprising a roller;
  a pair of annular rails for selectively receiving each of said rolling assemblies, each of said annular rails extending upwardly away from said lower wall of said upper portion, each of said annular walls being positioned generally next to each other, wherein each of said rolling assemblies move between said pair of rails;
  a supporting shaft for supporting said vehicle supporting platform, said supporting shaft having a first end and a second end, said first end of said supporting shaft being mounted to a central point of said vehicle supporting platform, said second end of said supporting shaft extending downwardly toward said bottom wall of said lower portion;
  a gear being mounted to a portion of said supporting shaft, said gear being positioned generally an equal distance between said vehicle supporting platform and said bottom wall of said lower portion, said gear extending around a circumference of said supporting shaft;
  a bearing member for rotatably mounting said second end of said shaft to said bottom wall of said lower portion, said bearing member being movably mounted in said annular member, said bearing having a disk, a peripheral edge extending downwardly away from said disk, and a plurality of balls for rotatably moving said disk, each of said balls being movably positioned between said disk and said perimeter wall of said bearing, said second end of said shaft being rotatably mounted to an upper surface of said disk;

a motor for turning said shaft, said motor being operationally coupled to said gear, said motor being positioned generally between said supporting shaft and said peripheral wall of said lower portion;

a switch for turning said motor ON and OFF, said switch being electrically connected to said motor; and a power supply for selectively providing power to said motor, said power supply being electrically connected to said motor.

* * * * *